July 17, 1951 F. X. LAMB 2,560,879
ZERO CORRECTOR FOR ELECTRICAL INSTRUMENTS
IN HERMETICALLY SEALED CASINGS
Filed May 6, 1947

Inventor:
Francis X. Lamb,
By Pierce, Scheffler & Parker,
Attorneys.

Patented July 17, 1951

2,560,879

UNITED STATES PATENT OFFICE 2,560,879

ZERO CORRECTOR FOR ELECTRICAL INSTRUMENTS IN HERMETICALLY SEALED CASINGS

Francis X. Lamb, East Orange, N. J., assignor to Weston Electrical Instrument Corporation, Newark, N. J., a corporation of New Jersey Application May 6, 1947, Serial No. 746,397

8 Claims. (Cl. 171—95)

This invention relates to electrical measuring instruments and in particular to those in which the instrument mechanism is hermetically sealed within its casing.

When electrical measuring instruments are to be used in high humidity climates, or exposed to the weather, or used in places where the surrounding air is heavily laden with dirt, dust or injurious chemicals and gases, it has been found most desirable to hermetically seal the instrument mechanism within its casing. The general object of this invention is to provide an improved construction for sealing the zero corrector device of the instrument. Another object is to provide a sealed zero corrector for an electrical measuring instrument which may be released to make the necessary adjustment and then secured in its adjusted position without breaking the hermetic seal.

A more specific object is to provide a sealed zero corrector for an electrical instrument comprising a headed stud passed through the instrument casing, a ring of thermo-responsive sealing and bonding material such as soft solder being confined between the stud head and casing to provide a hermetic seal around the stud shank, and which upon heating permits rotation of the adjusting stud without breaking the seal between the interior of the casing and the surrounding air.

The foregoing and other objects and advantages of the invention will become more apparent from the following detailed description and from the accompanying drawings which illustrate preferred constructions.

Figure 1:
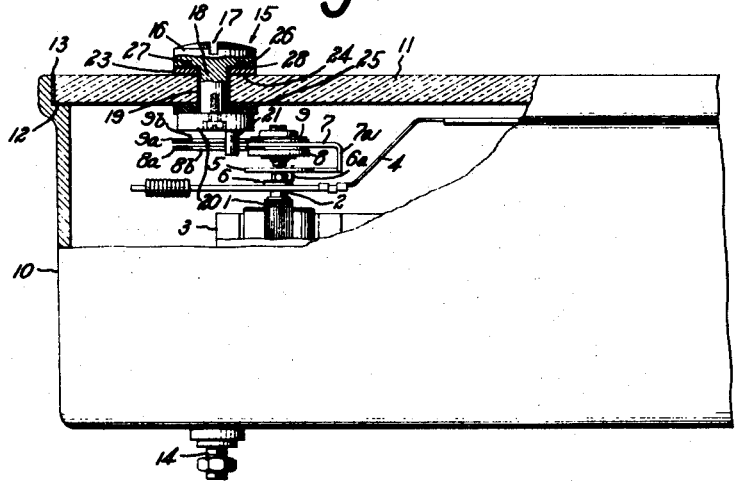
Figure 2:
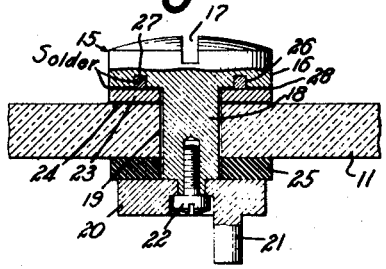
Figure 3:
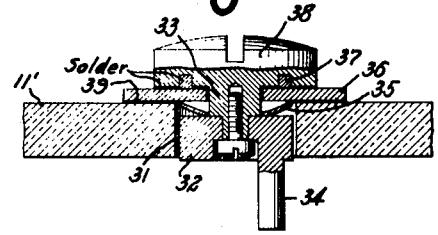
Figure 4:
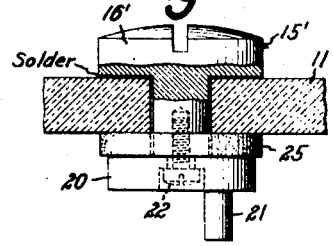

In the drawings, Fig. 1 is a side elevation of a measuring instrument with part of the casing broken away to show details of construction; Fig. 2 is a vertical section drawn to an enlarged scale of the sealed zero corrector device shown in Fig. 1; and Figs. 3 and 4 are views similar to Fig. 2 illustrating other embodiments of the invention.

Referring now to Figs. 1 and 2, the electrical instrument there shown is of the well known moving coil-permanent magnet type such as used in ammeters, instrument type relays, etc., and includes a coil 1 mounted on a staff 2 for rotation between the poles of a permanent magnet 3. Staff 2 also mounts a pointer 4 which rotates with coil 1 over a scale plate, not shown, to indicate the magnitude of the coil displacement.

For returning the coil and pointer to zero indication on the scale plate when the coil current is zero, a spiral spring 5 is provide. The inner end of this spring is secured to the tab portion 6a of a disc 6 which is secured fast to the staff 2, and the outer end of spring 5 is connected to a downwardly turned ear 7a of disc 7 which is clamped between a pair of tongued discs 8 and 9. The tongued portions 8a, 9a of the latter which are aligned one above the other extend horizontally and contain slots 8b, 9b.

The mechanism of the measuring instrument so far described is conventional and is mounted within an enclosing casing 10 preferably of metal that is closed at the top by a transparent cover 11 that is hermetically sealed to a circumferential lip 12 on the casing by solder 13 or other material having properties which are suitable for providing a hermetic seal and bond between metal and glass. As shown in my co-pending application Ser. No. 19,525, filed April 7, 1948, the electrical connection to the instrument coil 1 may be taken into the casing 10 through terminal studs 14 that are sealed in glass bushings inserted through the bottom closure member of the casing.

The zero corrector for the coil 1 is comprised of a stud 15 of a metal of high thermal conductivity, such as brass or copper, with a kerf or equivalent non-circular recess 17 for receiving the correspondingly shaped end of a heated tool, a shank portion 18 extending through an opening 19 in cover plate 11, and a disc 20 at the lower end of the shank provided with a crank pin 21. Pin 21 is offset from the longitudinal axis of the stud, and disc 20 is secured to the lower end of the stud by screw 22. A washer 23 under the stud head 16 is soldered to the metallized upper surface of the cover glass 11 by a layer 24 of sealing material, and a washer 25 of resilient material such as rubber is placed between the lower face of cover 11 and the disc 20.

When the instrument casing is to be sealed off under a reduced pressure or a superatmospheric pressure, the underface of the stud head 16 is preferably provided with an annular recess 26 within which is placed sealing material 27 having a comparatively low melting point, such as one of the soft solders. If desired, a layer of soft solder may also be deposited on the upper face of washer 23 before the parts are assembled.

In assembling the zero corrector device, the washer 23 is first permanently sealed in place to the cover plate 11. The stud shank 18 is then inserted in the opening 19, rubber washer 25 is slipped over the end of the stud, and disc 20 then secured in place with screw 22 which when tightened against washer 25 compresses that latter the underside of cover plate 11 to draw the stud head 16 downwardly against the metallic washer 23 thus holding the stud assembly firmly in position.

The moving system of the instrument may be initially set to zero at the factory by adjusting the angular position of stud 15 with the aid of a screw driver or other tool inserted in the slot 17. As the stud is turned, pin 21 executes a rotary movement about the stud axis, which motion causes the discs 7, 8 and 9 to execute a corresponding rotary movement about the axis of staff 2. As disc 7 turns it carries the outer end of spring 5 with it, and a corresponding turning movement of staff 2, coil 1 and pointer 4 ensues as the inner end of spring 8 follows the outer end. When pointer 4 has been aligned on the zero point of the scale graduations, the stud head 16 is then heated until the ring of solder 27 in recess 26 melts and unites with the layer of solder 28 on washer 23. The heat is then removed whereupon the ring soldered connection soon solidifies and bonds the stud head 16 to washer 23 thereby hermetically sealing the opening 19 in plate 11 at the underside of the stud head 16 with a ring of solder and also locking the stud in its adjusted position.

The zero corrector device may be reset at any time thereafter by reheating the stud head 16 such as with the heated end of a screw driver or the wedge-shaped end of a soldering iron until the soldered connection at the underface of the head begins to soften. The softening point on the solder 27 may be easily ascertained by applying a turning force to the screw driver as the stud is being heated. As the temperature of the solder approaches its melting point, the operator will note that the head will begin to turn under the applied force enabling him to rotate it in one direction or the other until the pointer 4 is once again aligned with the zero point on the scale plate. The heat is then removed from the stud head 16 whereupon the solder rehardens and locks the stud in its newly adjusted position.

During the adjusting period when the solder is in a softened or liquid state, the hermetic seal at the underface of the stud head 16 is not disturbed because of the fact that the rubber washer 25 maintains the stud head pressed tightly against washer 23. Thus even though the solder is in liquid form for a brief period, there is little or no leakage from the thin annular layer between the stud head 16 and the washer 23, and the hermetic sealing between the plate opening 19 and the exterior of the casing 10 is preserved throughout the period required to readjust the moving system of the instrument mechanism. The solder within the annular recess 26 is a reserve supply which maintains a good soldered connection in the event that some molten solder is forced out by a substantial difference in the pressures at opposite sides of the solder sealed joint.

A somewhat modified embodiment of the invention is shown in Fig. 3. In the modified construction, the opening 31 in the cover plate 11' is made somewhat larger to receive the disc 32 at the lower end of the stud shank 33, leaving only the crank pin 34 projecting below the lower face of the cover plate. A spring washer 35 on the stud shank presses against the lower face of washer 36 rather than upon the cover plate as in the Fig. 1 construction. The remaining construction is like that of Fig. 1 in that a reserve of solder 37 is provided in a recess at the lower face of the stud head. A thin film of solder bonds and seals the stud head 38 to the washer 36 which, in turn, is permanently sealed to the cover plate 11' by a solder layer 39. The modified construction is of advantage since the stud and its associated parts may be assembled as a unit prior to installation in the cover plate 11'.

The zero corrector illustrated in Fig. 4 is a simplified form of the Fig. 2 construction which omits the reserve supply of solder and also the washer 28. The lower surface of the head 16' of the stud 15' is in contact with and soldered to the metallized surface of the glass cover 11.

The invention may be employed with other types of electrical instruments and other types of instrument casings, for example casings with metal cover plates provided with window openings across which glass plates are soldered. The zero corrector for such casings will be located at the metal portion of the cover in the usual manner, and sealed to the metal portion by soft solder.

In conclusion, it will be evident that while the described and illustrated constructional forms of the zero corrector are to be preferred, various changes in the construction and arrangement of parts may be made without departing from the spirit and scope of the invention as defined in the appended claims.

I claim:

1. A zero corrector for a hermetically sealed electrical instrument comprising a headed stud the shank of which projects into an opening through the instrument casing and the head of which extends over the outer surface surrounding said opening in the casing, said stud head being provided with a substantially annular recess in its underface, and means including solder disposed in said recess for bonding said head to said surface to provide a hermetic seal between the casing exterior and the shank of said stud.

2. A zero corrector as recited in claim 1, in combination with resilient means urging said stud head towards said outer surface surrounding the opening of said casing, thereby to maintain the hermetic sealing of the casing upon softening of the solder by heating said stud when the latter is to be adjusted angularly.

3. A zero corrector for an instrument hermetically sealed within an enclosing casing which includes a glass cover plate having an opening therethrough; said corrector comprising a headed stud having a shank which projects into said opening of said cover plate, a metallic washer sealed to the outer surface of said cover plate and having an opening through which the stud shank passes, said stud head being provided with a substantially annular recess in its underface, a ring of solder disposed in said recess bonding said stud head to said washer and providing a hermetic seal between the exterior of said casing and the shank of said stud, and resilient means urging said stud head and washer into contact.

4. A zero corrector as defined in claim 3, wherein said resilient means is comprised of a resilient disc disposed on said stud and which reacts against the inner surface of said cover plate adjacent the opening.

5. A zero adjuster as defined in claim 3, wherein said resilient means is a resilient disc disposed on said stud and which reacts against the inner surface of said metallic washer.

6. A zero corrector for an electrical instrument hermetically sealed within a casing which includes a cover overlying the axis of the moving system of the instrument, said cover having an opening therethrough displaced from said axis; said zero corrector comprising a headed stud having a shank extending through said opening, the inner surface of the shank head being closely adjacent the outer surface of said cover, and solder bonding and sealing said inner surface of the stud head to the casing cover.

7. A zero corrector as recited in claim 6, wherein said cover is glass having a metallized surface surrounding said opening; and said solder unites said metallized surface and said stud head.

8. A zero corrector as recited in claim 6, in combination with resilient means urging the inner surface of said stud head into engagement with the solder which bonds the same to the casing cover.

FRANCIS X. LAMB.

REFERENCES CITED

The following references are of record in the file of this patent:

UNITED STATES PATENTS

| Number | Name | Date |
| --- | --- | --- |
| 78,474 | Norton | June 2, 1868 |
| 931,759 | Hathaway | Aug. 24, 1909 |
| 1,501,698 | Beckert | July 15, 1924 |
| 1,660,650 | Mailey | Feb. 28, 1928 |
| 1,661,214 | Carpenter | Mar. 6, 1928 |
| 1,835,658 | Mabie | Dec. 8, 1931 |
| 2,097,073 | Long | Oct. 26, 1937 |
| 2,132,667 | Wilson | May 21, 1937 |
| 2,422,714 | Bigelow et al. | June 24, 1947 |

FOREIGN PATENTS

| Number | Country | Date |
| --- | --- | --- |
| 565,107 | Great Britain | Oct. 26, 1944 |